(12) United States Patent
Hyde

(10) Patent No.: US 7,215,251 B2
(45) Date of Patent: May 8, 2007

(54) METHOD AND APPARATUS FOR CONTROLLED PERSISTENT ID FLAG FOR RFID APPLICATIONS

(75) Inventor: John D. Hyde, Corvallis, OR (US)

(73) Assignee: Impinj, Inc., Seattle, WA (US)

( * ) Notice: Subject to any disclaimer, the term of this patent is extended or adjusted under 35 U.S.C. 154(b) by 278 days.

(21) Appl. No.: 10/887,617

(22) Filed: Jul. 8, 2004

(65) Prior Publication Data

US 2005/0237843 A1    Oct. 27, 2005

Related U.S. Application Data

(60) Provisional application No. 60/562,154, filed on Apr. 13, 2004.

(51) Int. Cl.
*G08B 21/00* (2006.01)

(52) U.S. Cl. .................... 340/661; 340/644; 340/664; 340/572.1; 365/189.01; 365/204; 711/100; 711/103

(58) Field of Classification Search .................. None
See application file for complete search history.

(56) References Cited

U.S. PATENT DOCUMENTS

| | | | |
|---|---|---|---|
| 4,471,290 A | 9/1984 | Yamaguchi | |
| 4,962,342 A | 10/1990 | Mead et al. | |
| 5,299,154 A | 3/1994 | Oowaki et al. | |
| 5,512,463 A | 4/1996 | Stemmer | |
| 5,594,697 A | 1/1997 | Hirano et al. | |
| 6,046,683 A | 4/2000 | Pidwerbetsky et al. | |
| 6,404,325 B1 | 6/2002 | Heinrich et al. | |
| 6,639,509 B1 | 10/2003 | Martinez | |
| 6,661,278 B1 | 12/2003 | Gilliland | |
| 6,664,909 B1 | 12/2003 | Hyde et al. | |
| 7,006,068 B2 | 2/2006 | Haga | |
| 2003/0112128 A1* | 6/2003 | Littlechild et al. | ....... 340/10.52 |
| 2003/0137400 A1 | 7/2003 | Heinrich et al. | |

FOREIGN PATENT DOCUMENTS

| | | |
|---|---|---|
| WO | WO 03/096432 A1 | 11/2003 |
| WO | WO 03/096434 A1 | 11/2003 |

OTHER PUBLICATIONS

EPC Radio-Frequency Identity Protocols Generation 2 Identity Tag (Class 1): Protocol for Communications at 860 MHz-960Mhz, Last-Call Working Draft Version 1.0.2, Nov. 24, 2003, 66 pages.

* cited by examiner

*Primary Examiner*—Julie Bichngoc Lieu
(74) *Attorney, Agent, or Firm*—Blakely, Sokoloff, Taylor & Zafman LLP

(57) ABSTRACT

A Radio-Frequency Identification (RFID) transponder is provided. The RFID transponder may include a basic ID flag circuit having a VDD voltage node, an output voltage node, and a capacitor coupled to the VDD voltage node and the output voltage node to store an ID flag. A supplemental discharge current circuit coupled to the basic ID flag circuit is provided in order to control persistence duration of the state of the ID flag. The persistence duration of the state of the ID flag is controlled by maintaining supplemental discharge current, which is greater than the leakage current of the basic ID flag circuit.

32 Claims, 10 Drawing Sheets

METHOD AND APPARATUS FOR CONTROLLED PERSISTENT ID FLAG FOR RFID APPLICATIONS

RELATED APPLICATIONS

The present application is related to, incorporates by reference and hereby claims the priority benefit of the following U.S. Provisional Patent Application, assigned to the assignee of the present application:

U.S. Provisional Patent Application No. 60/562,154, filed Apr. 13, 2004, entitled "Method and Apparatus for Controlled Persistent ID Flag for RFID Applications".

FIELD OF THE INVENTION

One exemplary embodiment relates generally to the field of Radio Frequency Identification (RFID) transponders (e.g., RFID tags) and more specifically to a method and apparatus for controlled persistent ID flag for RFID applications.

BACKGROUND OF THE INVENTION

Radio Frequency Identification (RFID) tags are used in a multiplicity of ways. They may be used in locating and identifying accompanying objects, as well as for transmitting information about the state of an object. It has been known since the early 60's that electronic components of transponders could be powered by a sequence of periodic signal bursts sent by a reader (or interrogator) and received by a tag antenna on each of the transponders.

The RF electromagnetic field induces an alternating current in the transponder antenna that can be rectified by a RF diode of the transponder. The rectified current can be used for a power supply for the electronic components of the transponder, and enables the transponder to broadcast a return signal without itself having a self-contained power supply.

An illustrative cycle of a prior art operation of an array of ten RFID tags may be described as follows:

1. The base station or the reader is on channel one and RFID tags 1–8 respond by beginning their participation in the identification protocol. All eight tags are successfully identified.
2. The reader now hops to channel 2, and the frequency of channel 2 allows tags 7–9 to be powered. Tag 9 will now respond by beginning participation in the identification protocol, while tags 1–6 lose their power and therefore stop participating. Since tags 7 and 8 were already identified and continue to be powered sufficiently when operating on channel, they do not participate in the protocol.
3. The reader hops to channel 3. The frequency of channel 3 allows tags 2–10 to be powered. Tags 7–9 stay powered and do not participate in the protocol. However, tags 2–6 must be reidentified in order to identify the one truly new tag 10.

The RFID tags that are not well powered lose track of state information. This state information is essentially a bookmark in the communication sequence between the RFID tag and the base station. In running an ID protocol, for example, tags that newly enter the field, as well as tags that have lost power and then regained it while remaining in the field, are treated equally (i.e. tags that have lost power and regained it may be identified a second time). This process of again identifying an RFID tag that has previously been identified is, of course, inefficient. U.S. Pat. No. 6,404,325 (Heinrich et. al.) is directed at maintaining the integrity of state information retained by a Radio Frequency Transponder during a loss of power. In Heinrich, the state information is maintained by a mirror latches mechanism and a capacitor utilized as a power source for the mirror latches mechanism during the interval when the power supply to the RFID tag is interrupted. The time interval during which the mirror latches mechanism retains the state information (persistence of state) depends on the size of the capacitor. Persistence of state is also determined by the leakage current from the capacitor.

Of course, leakage may be primarily due to switches connected to the capacitor and not through the capacitor itself. The switches are open, and so only semiconductor leakage current flows through them.

Because the leakage current may vary with temperature, an RFID tag with a certain size capacitor may not retain state information as long as necessary at high temperatures and retain state information longer than is practicable at low temperatures.

SUMMARY OF THE INVENTION

According to one aspect, there is provided a Radio-Frequency Identification (RFID) transponder including an identification flag circuit to maintain a state of the identification flag indicating that the RFID transponder has responded to an interrogation signal, the identification flag circuit including a first capacitor and a digital element coupled to the first capacitor to receive a voltage of the first capacitor; and a discharge circuit to drain the first capacitor via a discharge current that is distinct from a semiconductor leakage current.

According to another aspect, the RFID transponder includes an additional charge circuit, wherein the semiconductor leakage current is through an open switch of the charge circuit.

According to yet another aspect, the digital element is a comparator, the comparator being to output a signal indicative of the identification flag.

According to a further another aspect, the discharge circuit is to maintain the discharge current substantially constant with temperature.

Other features of the present invention will be apparent from the accompanying drawings and from the detailed description which follows.

BRIEF DESCRIPTION OF THE DRAWINGS

The present invention is illustrated by way of example and not limited in the figures of the accompanying drawings, in which like references indicate similar elements and in which.

DETAILED DESCRIPTION

Figure 1:
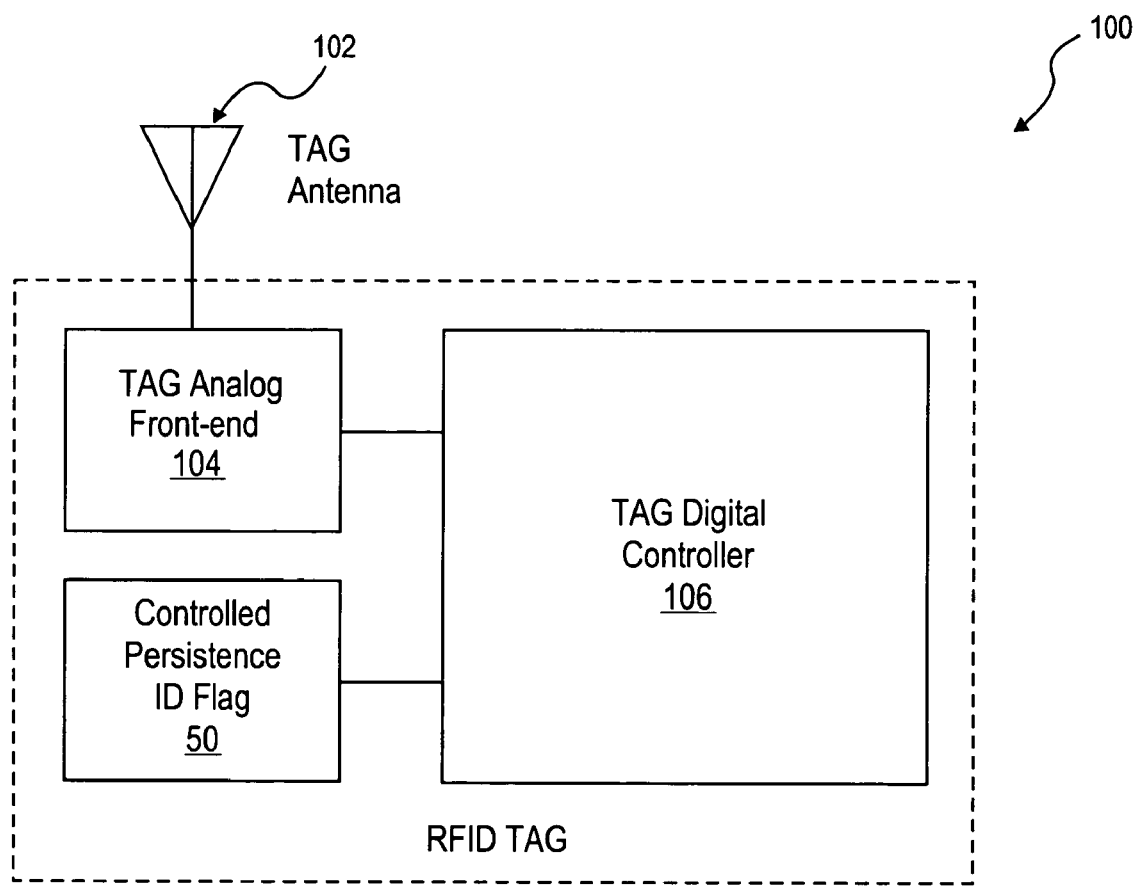
FIG. 1 is a block diagram of components of an RFID tag, according to one exemplary embodiment of the present invention.

A method and apparatus to implement a controlled persistent identification (ID) flag for RFID applications are described. In the following description, for purposes of explanation, numerous specific details are set forth in order to provide a thorough understanding of the present invention. It will be evident, however, to one skilled in the art that the present invention may be practiced without these specific details.

Because passive RFID tags do not have an independent source of power, it may be desirable that the tag state can be maintained during the temporary power loss (e.g., when the RFID tag is no longer illuminated by an interrogator RF signal). Passive RFID tags receive power from an RF link. An RF link may not be reliable and thus temporary power drops are not uncommon. The following scenario may illustrate a situation that an ID flag or persistent storage bit is intended to address.

Consider a population of tags, for example, affixed to a number of cases of merchandise in a delivery truck. An employee is scanning these cases of merchandise (effectively, the tags) with an RFID reader (or interrogator) device in order to count them. The process of scanning and counting the tags may include the reader sending an RF signal to the tags via a forward link and receiving a response from each of the tags via a backscatter link. It is desirable that the tags that have already been identified and counted by the reader do not respond to the reader, which may be accomplished by setting a state of an ID flag on the tag.

While the RFID reader is in the process of scanning the tags, the power on some of the tags may drop in and out as the cases of merchandise move around and the RF fields change at each tag location. Another frequent cause of the power loss may be due to frequency hopping, pursuant to FCC or ETSI emissions requirements by the RFID reader. Every time there is a hop in frequency, there is a potential that a tag will lose power for an entire hop and not restore power again until the next hop. Such temporary loss of power may result in clearing the state of the ID flag, such that the tag will respond to the reader again, even though it has already been identified and counted. When the state of an ID flag is cleared during a temporary power loss, the reader will not make a counting mistake because each tag may be uniquely identified. However, the need to identify and count the tag, that has already been identified and counted, again would potentially increase the amount of time needed to scan the population of tags. Thus, it is desirable that the state of the ID flag persists during a temporary power loss. The duration of time for which an ID flag needs to persist is not very long, but enough to maintain the state of an ID flag during a temporary power outage.

There may be a situation where it is desirable that the persistence of the state of an ID flag does not persist longer than a predetermined duration. An illustration of such situation is where a delivery truck arrives a warehouse and the truck driver goes into the back of this truck and takes a handheld reader (a first reader) and runs an inventory of all the goods to be transferred to the warehouse. In the process of scanning the goods (and the associated tags), the reader (the first reader) sets the states of the ID flags on all the tags. Then, a forklift drives up to the truck and then moves one pallet of goods into the warehouse, after which a warehouseman takes a reader (a second reader) and scans all the goods on the pallet. In this situation, if the state of the ID flags is still set (e.g., beyond a predetermined maximum duration), the second reader would not see the goods because the tags on the pallet do not respond to the second reader. Therefore, it is desirable that maximum persistence duration of the state of the ID flag be controllable.

FIG. 1 is a block diagram of components of an RFID tag in the exemplary form of an RFID tag 100, according to one exemplary embodiment of the present invention. The RFID tag 100 may include a tag antenna 102, an analog front end 104, a digital controller 106, and a controlled persistence ID flag circuit 50. The controlled persistence ID flag circuit 50 provides stored state information (e.g., the state of the ID flag) to the digital controller 106. The state of the ID flag may indicate, for example, that the RFID tag 100 has responded to an interrogation signal, which may indicate that the item associated with the RFID tag has already been scanned. Similarly, the state of the ID flag may indicate, for example, that the RFID tag 100 has not responded to an interrogation signal, which may indicate that the item associated with the RFID tag has not yet been scanned.

Figure 2:
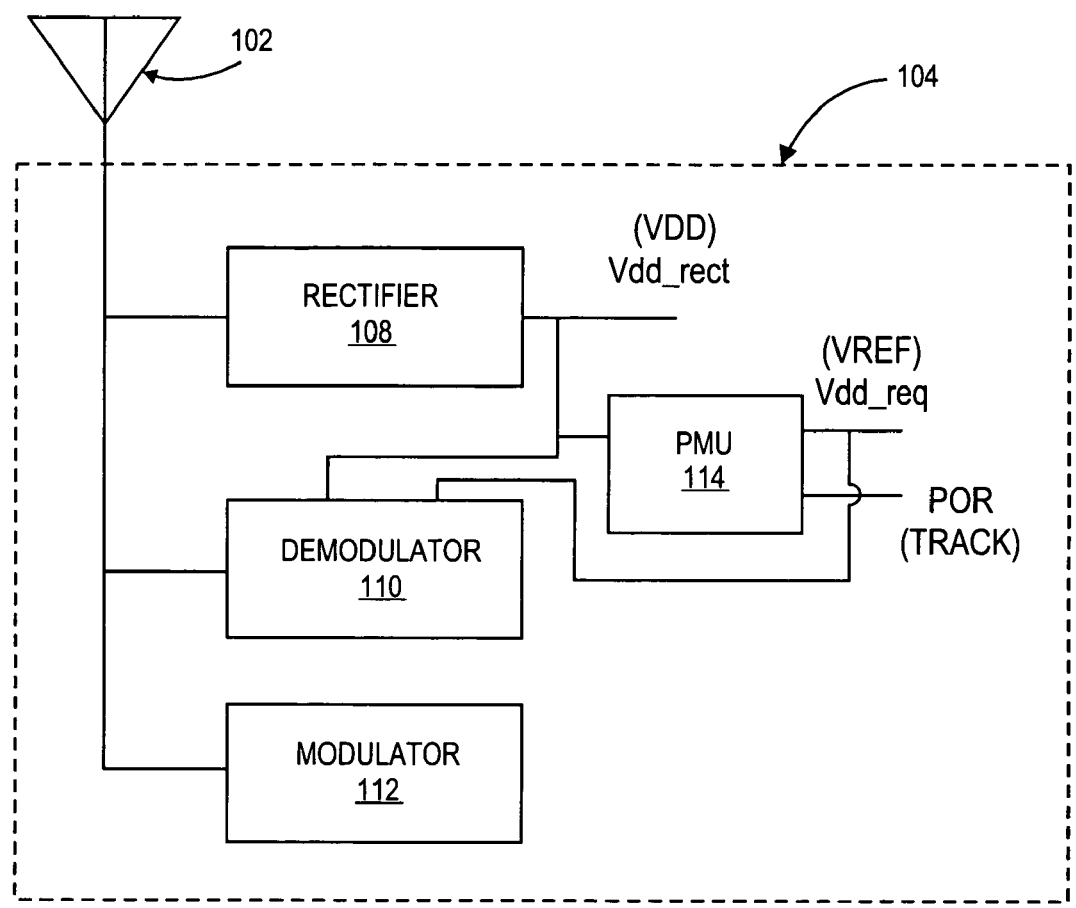
FIG. 2 is a block diagram of the analog front end of an RFID tag, according to one exemplary embodiment of the present invention.

Within the analog front end 104, as shown in FIG. 2, there may be a rectifier 108, a demodulator 110, a modulator 112, and a Power Management Unit (PMU) 114. The rectifier 108 has an output of a VDD_rect voltage. The VDD_rect voltage is applied to the PMU 114. The PMU 114 converts the VDD_rect voltage into a regulated voltage VDD_reg. Both the VDD_rect voltage and the VDD_reg voltage are applied to the digital controller 106 and to the demodulator 110 within the analog front end 104. The PMU 114 may also generate a power on reset ("POR") signal. The POR signal may be applied to a TRACK voltage node.

Figure 3A:
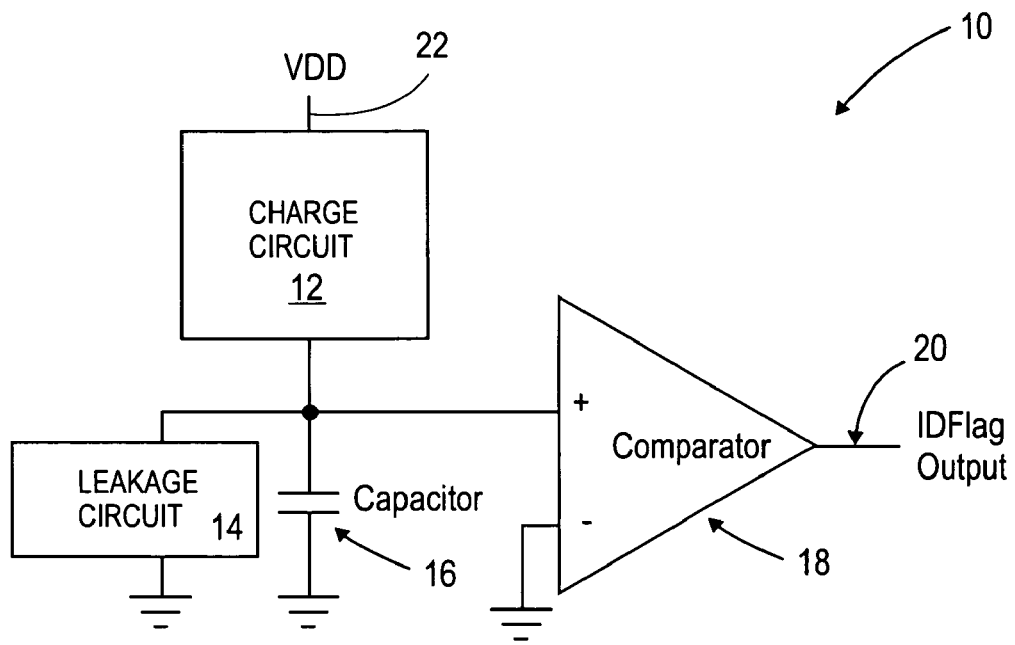
FIGS. 3A, 3B and 3C are schematic diagrams of a basic ID flag circuit.
Figure 3B:
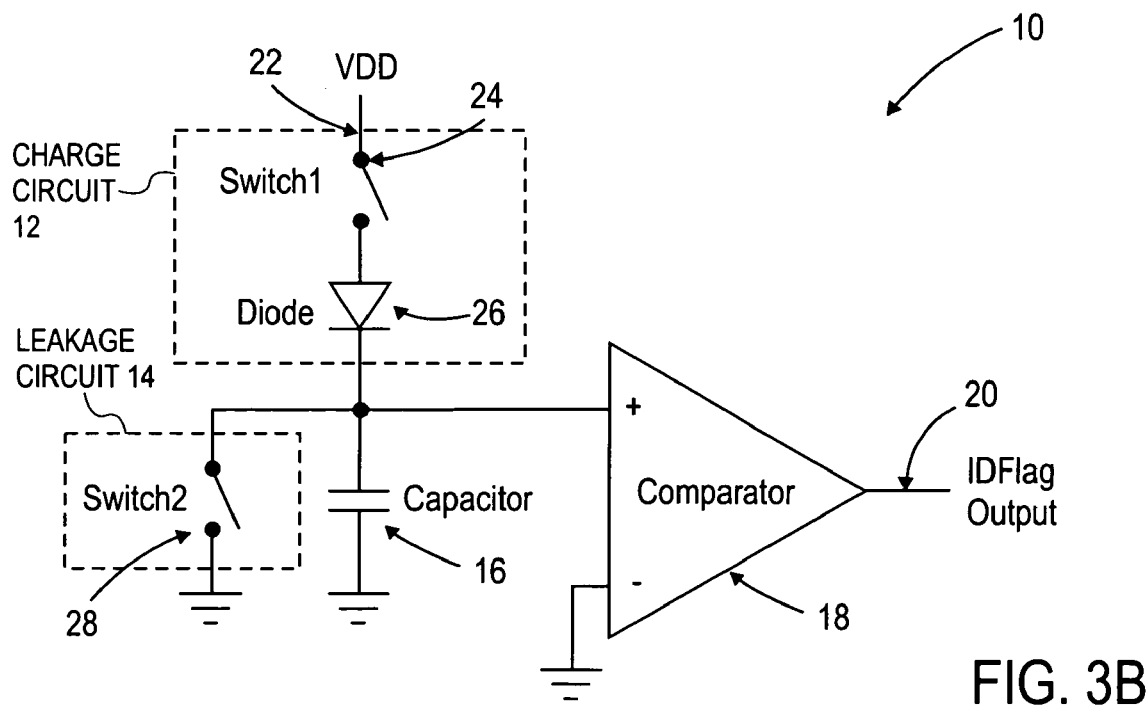

FIGS. 3A and 3B are schematic diagrams of an ID flag circuit 10. Referring to FIG. 3A, the ID flag circuit 10 includes an input voltage node 22 coupled to VDD, a charge circuit 12 coupled to VDD, a leakage circuit 14, a first capacitor 16, a comparator 18, and an output voltage node 20. Referring to FIG. 3B, the charge circuit 12 includes a first switch 24 and a diode 26. The leakage circuit 14 includes a second switch 28. When the first switch 24 is closed and the second switch 28 is opened, the first capacitor 16 is charged through the diode 26. When the second switch 28 is closed and the first switch 24 is open, the first capacitor 16 is discharged and therefore the voltage on the output voltage node 20 is low. The voltage on the output voltage node 20 determines the state of the ID flag. The comparator 18 sets the output of the ID flag circuit 10 to "1" if the first capacitor 16 is charged up. As the first capacitor 16 discharges, the supply voltage may also be affected. At some point, the output of the first capacitor 16 drops to zero.

In the power-off state, when VDD is low, both switches 24 and 28 are open, and therefore the charge on the first capacitor 16 is maintained even when the power is not present. Because the charge on the first capacitor 16 determines the state of the ID flag, the state of the ID flag is maintained even when the power is not present. The persistence of the state of the ID flag is determined by semiconductor leakage current through the diode 26 and the first switch 24 that could vary greatly with temperature. Because the semiconductor leakage current could vary greatly with temperature, the persistence of the ID flag state is not well controlled. For example, if a required minimum persistence is about 250 milliseconds at high temperature, then at low temperature where there is almost no leakage, the persistence may be in the order of minutes. This differential in leakage characteristics may present a problem in a two reader scenario provided above.

Figure 3C:
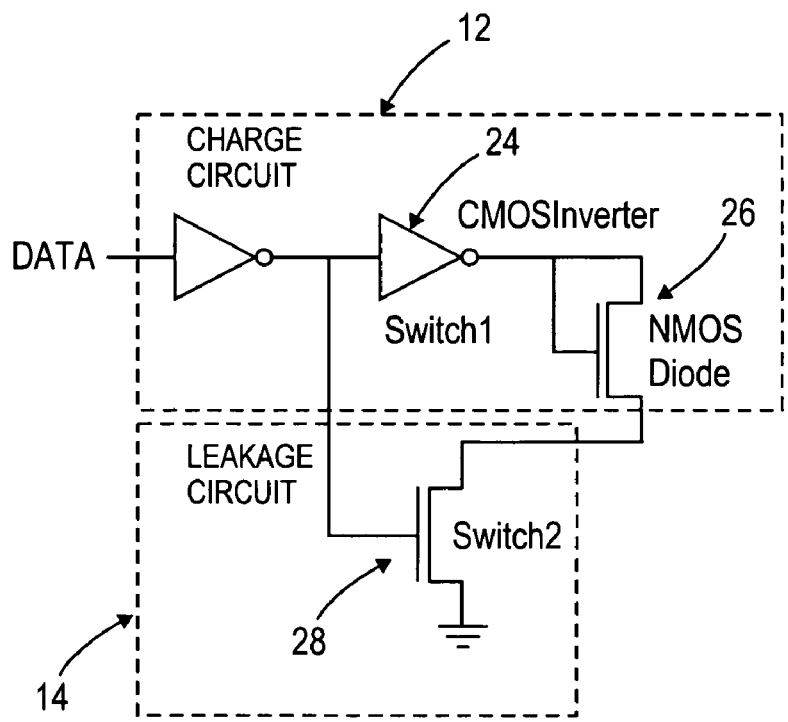

FIG. 3C is a schematic diagram of an exemplary implementation of components of the ID flag circuit 10. The first switch 24 is implemented using a CMOS inverter; and the second switch 28 and the diode 26 are shown as NMOS devices. The diode 26 is shown as an NMOS diode. The diode 26 may be either a MOS diode or a pn diode. A MOS diode may have a lower "turn on" voltage and therefore may allow a lower supply voltage. However, when a sufficiently high supply voltage is available, then a regular pn junction diode may be appropriate. The fact that the leakage may be higher through a MOS diode than through a pn junction diode (and thus influence persistence time of the state of the ID flag) may determine the choice of a pn junction diode over a MOS diode. In an embodiment where a MOS diode is utilized, an NMOS diode is useful, because a PMOS diode has parasitic source and drain to N-well junction diodes that would become forward biased when VDD is low.

Figure 3D:
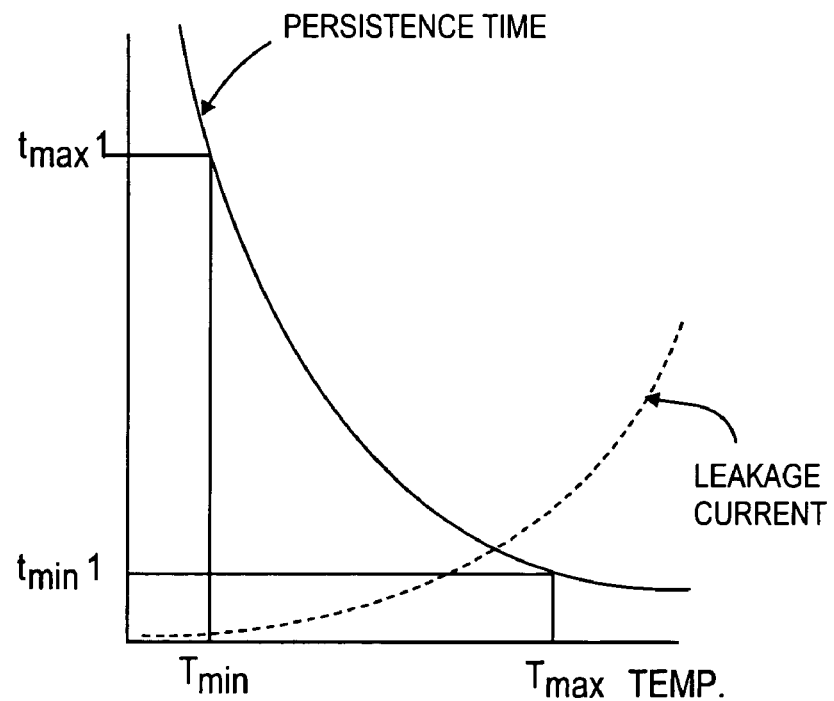
FIG. 3D is a diagram illustrating behavior of a basic ID flag circuit.

FIG. 3D is a diagram illustrating dependence of the ID flag persistence duration and the leakage current on temperature. As is shown on FIG. 3D, the leakage current increases exponentially with the increase of temperature. The ID flag persistence duration, on the other hand, decreases exponentially with the increase of temperature because it depends in the inverse on the leakage current. When the temperature is T min, the ID flag persistence duration is at t max1; when the temperature is T max, the ID flag persistence duration is at t min1. Thus, in the ID flag circuit 10, the ID flag persistence duration varies significantly with temperature (e.g., t max1 over t min1 may be about a hundred, because the leakage current starts from very low values at reasonable temperatures). This problem may be addressed by introducing a supplemental discharge current circuit as shown in FIG. 4A.

Figure 4A:
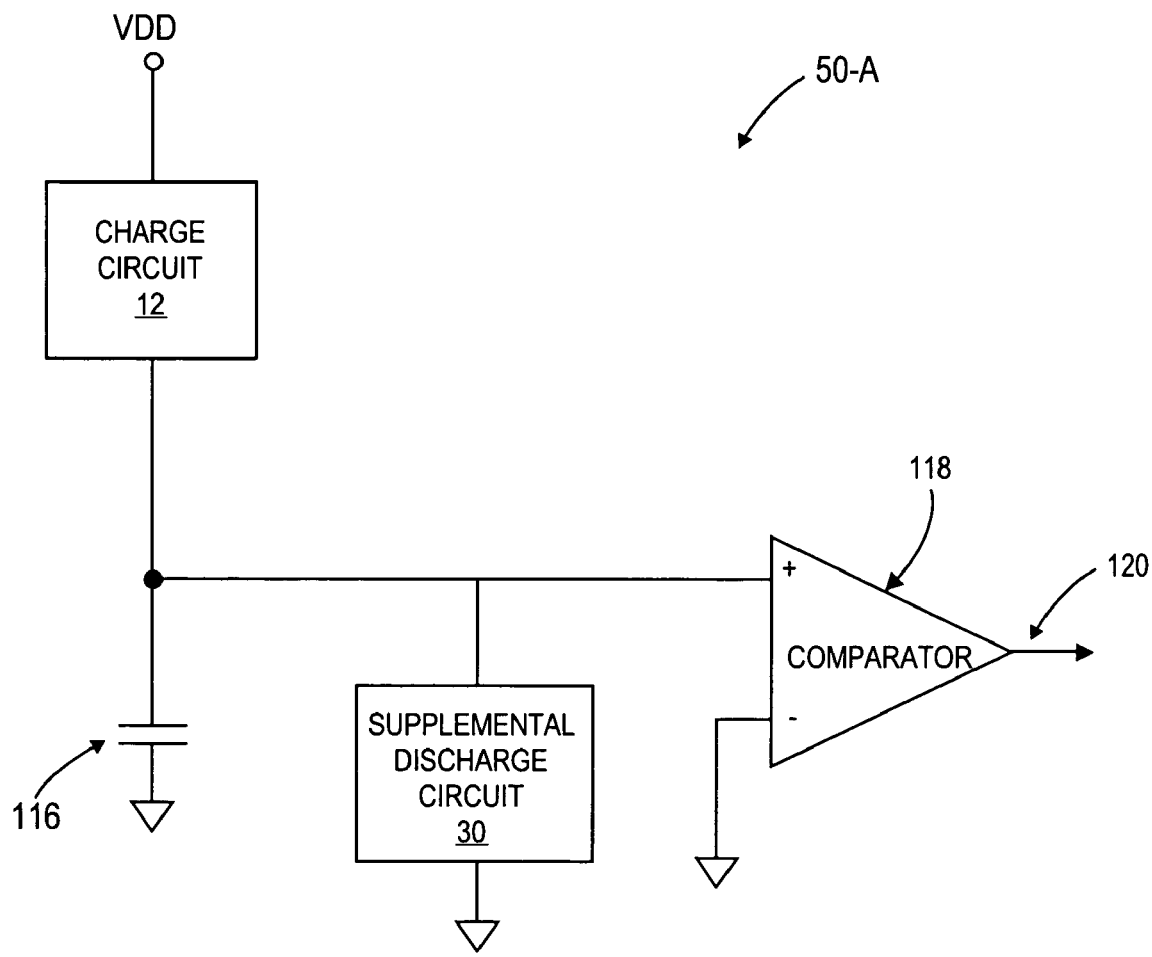
FIG. 4A illustrates an enhanced ID flag circuit, according to one exemplary embodiment of the present invention.

FIG. 4A illustrates an enhanced ID flag circuit 50-A, according to one exemplary embodiment of the present invention. The enhanced ID flag circuit 50-A includes the charge circuit 12, a capacitor 116, a digital element (e.g., a comparator 118), and a supplemental discharge current (SDC) circuit 30. The SDC circuit 30 is provided to address the difficulties present in the devices illustrated in FIGS. 3A–3D in controlling the persistence time of the ID flag state.

Figure 4B:
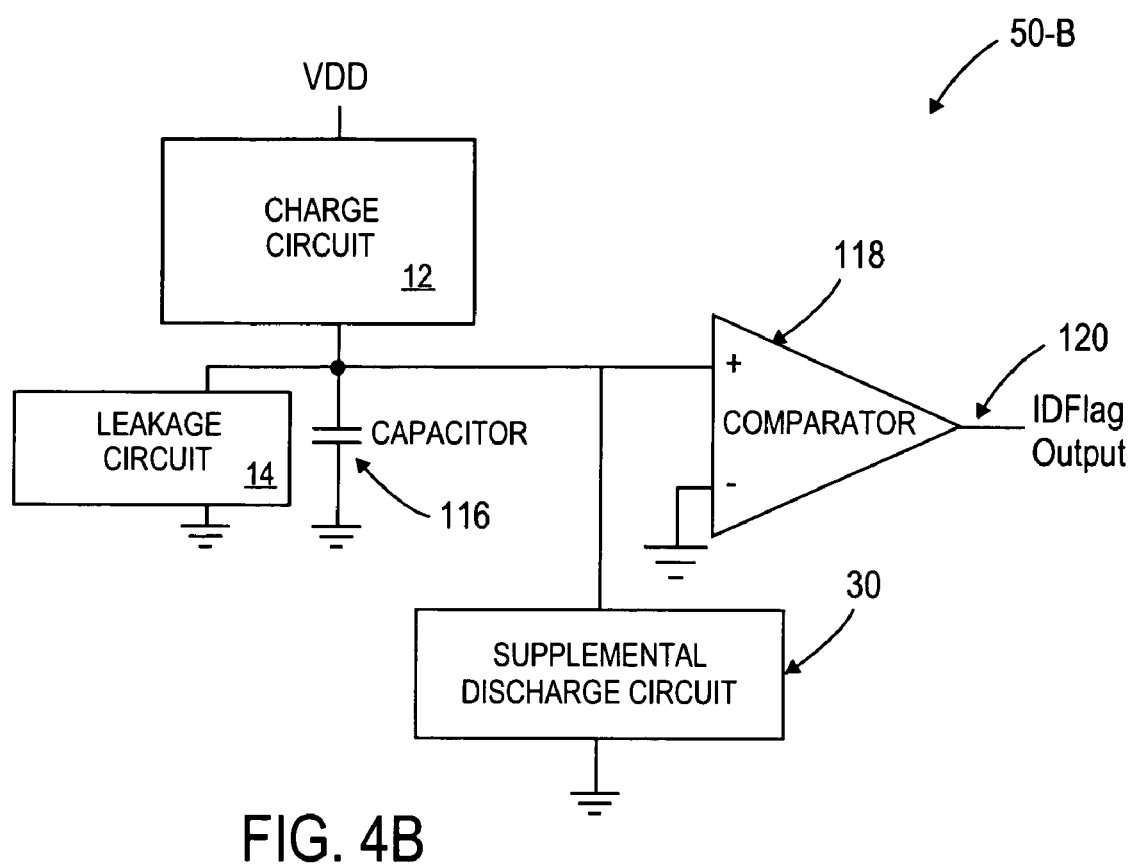
FIG. 4B illustrates an enhanced ID flag circuit, according to another embodiment of the present invention.

FIG. 4B is another diagram of an enhanced ID flag circuit 50-B, according to another exemplary embodiment of the present invention. The enhanced ID flag circuit 50-B includes the charge circuit 12, the leakage circuit 14, the capacitor 116, the comparator 118, an output voltage node 120, and the SDC circuit 30. The SDC circuit 30 generates discharge current, which may be deliberately made larger than the leakage current at a predetermined range of temperatures (e.g., between negative 25 degrees Celsius and 50 degrees Celsius), so that even though the leakage may vary considerably with temperature, the persistence of the state of the ID flag is controlled by the sum of the discharge current and the leakage current. Since the discharge current dominates the variation in the leakage current at a predetermined range of temperatures, the leakage current does not cause a large variation of persistence of the state of the ID flag. It will be noted that the supplemental discharge current may be characterized as intentional discharge current as opposed to accidental leakage current.

In one exemplary embodiment, desired minimum persistence duration may be 500 milliseconds, and desired maximum persistence duration may be 20 seconds. In one exemplary embodiment, the ID flag is implemented as a single bit.

In one exemplary embodiment, a digital Non Volatile Memory ("NVM") may be utilized to increase the accuracy of the discharge current. A calibration stage during factory test may be performed. The NVM may be used to control the size of the transistor that is connected to the second capacitor in creating the discharge current.

Figure 5:
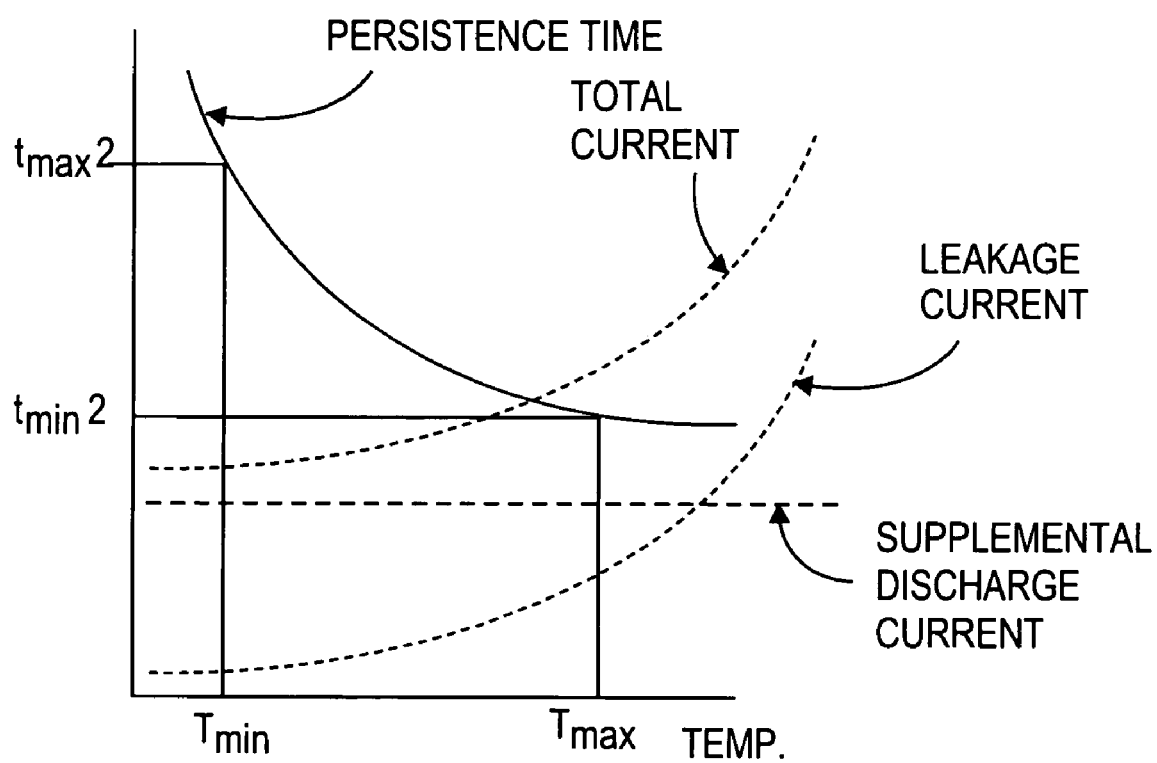
FIG. 5 is a diagram illustrating the dependence of the ID flag persistence duration on the temperature for an enhanced ID flag circuit, according to one exemplary embodiment of the present invention.

FIG. 5 is a diagram illustrating the dependence of the ID flag persistence duration on the temperature for the enhanced ID flag circuit 50-B. As is shown in FIG. 5, the ID flag persistence duration in the enhanced ID flag circuit 50-B decreases more gradually with the increase of temperature as compared to the basic ID flag circuit 10 (see FIG. 3D). In FIG. 5, when the temperature is at T min, the ID flag persistence duration is at t max2; when the temperature is at T max, the ID flag persistence duration is at t min2. Thus, in the ID flag circuit 50-B, t max2 over t min2 may be about three, as opposed to a hundred, as shown in FIG. 3D. The total current affecting the persistence time equals the sum of the leakage current and the supplemental discharge current. In other words, the persistence of the state of the ID flag is controlled by the sum of the supplemental discharge current and the leakage current. In FIG. 5, the supplemental discharge current remains constant with temperature. It will be noted that in one exemplary embodiment of the present invention, the supplemental discharge current may decrease as the temperature increases, which may result in even less variation of the total current and thus in even less variation in the persistence time.

Figure 6:
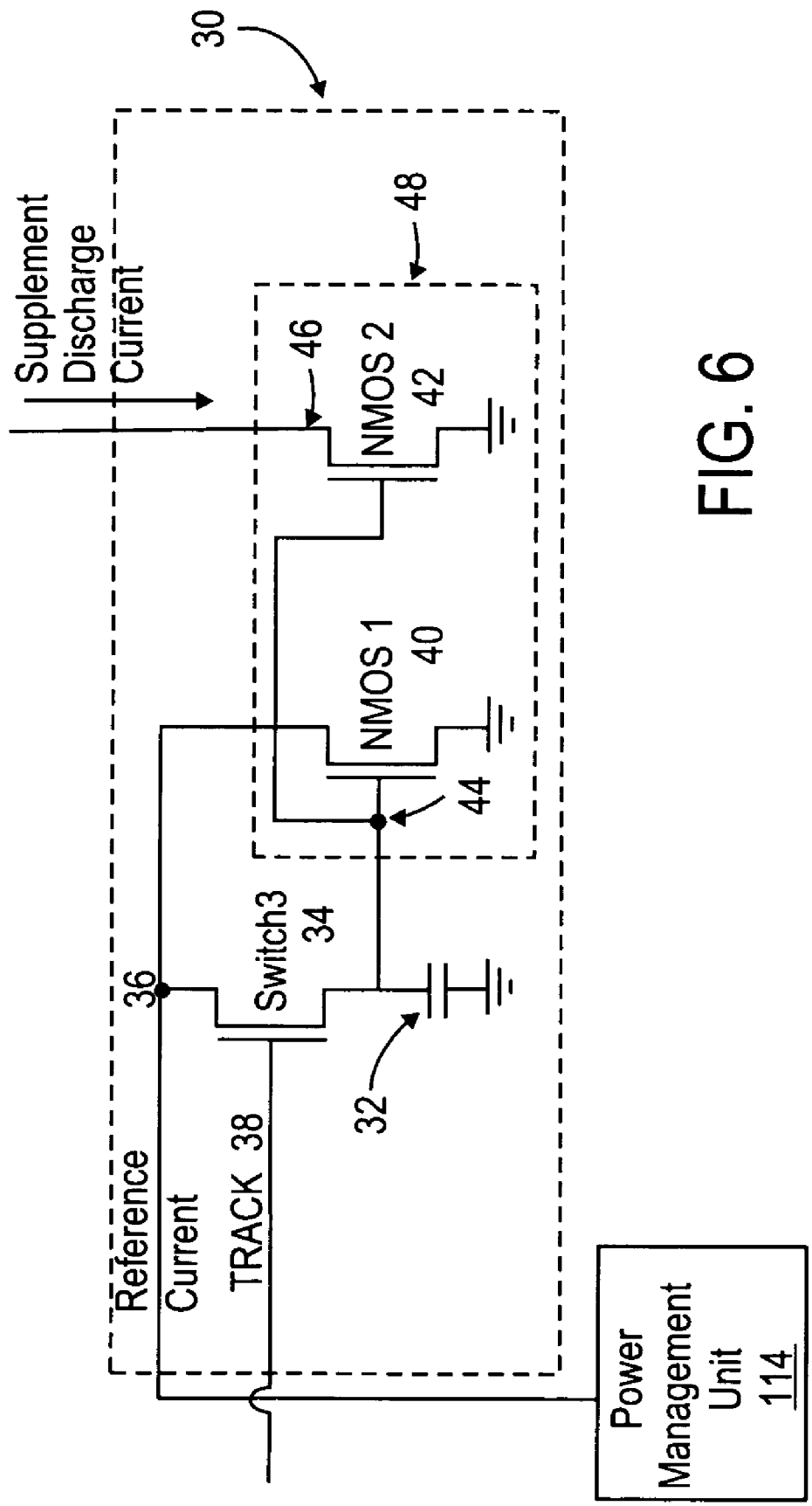
FIG. 6 is a schematic diagram illustrating an implementation of a supplemental discharge current circuit, according to one exemplary embodiment of the present invention.

FIG. 6 is a schematic diagram illustrating an implementation of the SDC circuit 30, according to one exemplary embodiment of the present invention. In FIG. 6, the SDC circuit 30 includes a second capacitor 32 to store voltage and a transconductor circuit 48 (e.g., a transistor) connected as a current source to convert the voltage stored in the second capacitor 32 into current. The second capacitor 32 may control a transistor, or a transconductor circuit 48, that generates the discharge current. Utilizing the second capacitor 32 may allow the discharge current to actually decrease with the increasing of temperature, thereby making the total current of FIG. 5 even less dependent on temperature and thus bringing t min2 even closer to t max2.

The SDC circuit 30 may include a switch 34, coupled to a reference current (RC) voltage node 36, also coupled to a TRACK voltage node 38, and to the second capacitor 32. The transconductor circuit 48 may include a first NMOS device 40 and a second NMOS device 42, the first NMOS device 40 and the second NMOS device 42 coupled to the second capacitor 32 at a gate node 44. When power is provided to the enhanced ID flag circuit 50, a reference current is present and can be detected at an RC voltage node 36.

When the reference current is present, the second switch 34 is closed, thus coupling the RC voltage node 36 to the second capacitor 32. The first NMOS device 40 therefore coupled to the second NMOS device 42 as an NMOS diode.

The reference current is running through the first NMOS device 40 and setting up voltage at the gate node 44 proportional to the reference current on the first NMOS device 40. The second capacitor 32 is charged up to the voltage at the gate node 44. The first NMOS device 40 and the second NMOS device 42 together form a current mirror, where the W/L ratio of the second NMOS device 42 is smaller than the W/L ratio of the first NMOS device 40. The difference of the W/L ratio of the second NMOS device 42 and the W/L ratio of the first NMOS device 40 may be utilized to maintain the discharge current that is sufficiently small. For example, a reference current of one nano ampere may be running into the first NMOS device 40, whereas a discharge current of one or two pico amperes may be running out of the second NMOS device 42.

When the enhanced ID flag circuit 50 stops receiving power, the switch 34 is opened. In one exemplary embodiment, the power management unit (PMU) 114 may be coupled to the SDC circuit 30, such that when a power drop below a predetermined threshold is detected at the TRACK voltage node 38, the switch 32 is opened. Because the switch 32 is opened when a power-off condition is detected, the second capacitor 32 maintains the charge accumulated at it, which facilitates maintaining the gate voltage of the first NMOS device 40 at the same level as the gate voltage of the second NMOS device 42 (which is the voltage at the gate node 44). Therefore, even though the reference current is no longer present, the first NMOS device 40 and the second NMOS device 42 both have the gate voltage present; and the second NMOS device 42 also has the drain voltage at a voltage node 46. The drain voltage on the second NMOS device 42 is the voltage stored on the first capacitor 16. Because the gate voltage of the second NMOS device 42 remains constant, the drain current of the second NMOS device 42, which is the discharge current, also remains constant even when the power is not present. Because the discharge current is required to be small, the W/L ratio of the second NMOS device 42 is much smaller than the W/L ratio of the first NMOS device 40.

Figure 7:
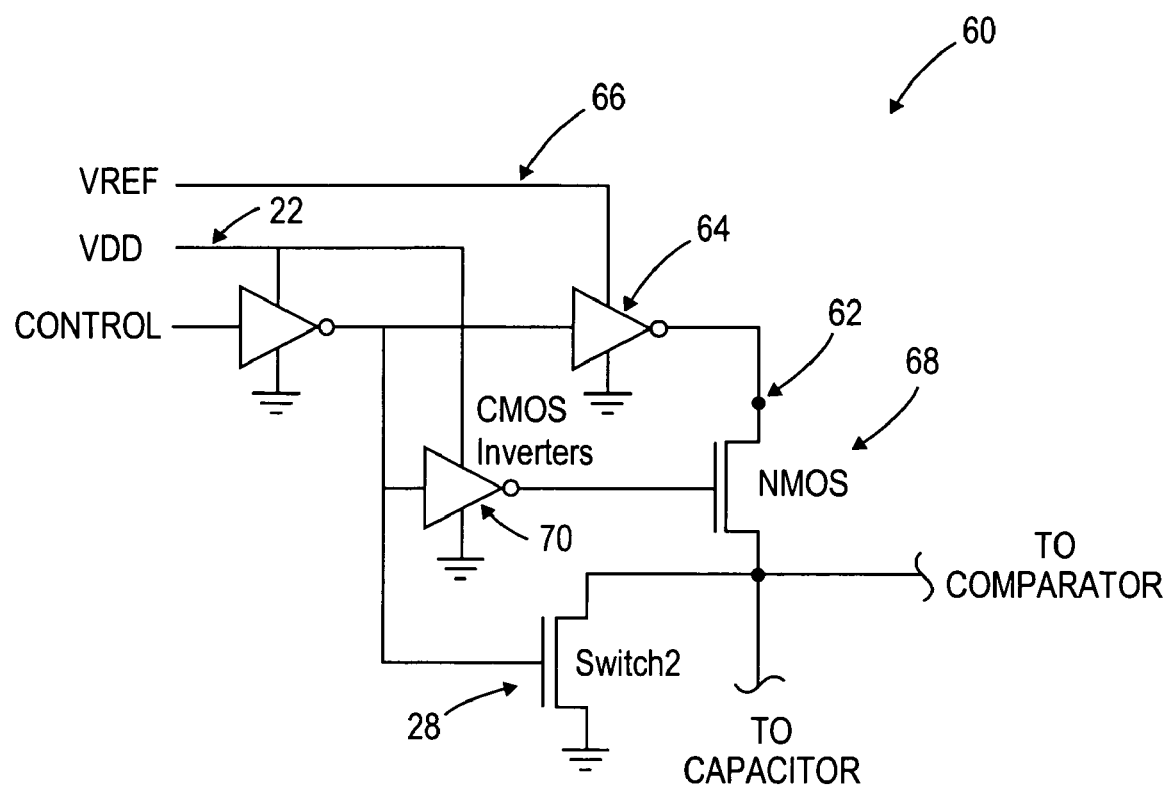
FIG. 7 is a schematic diagram to show an exemplary embodiment of a charge and leakage circuit within the enhanced ID flag circuit, according to one exemplary embodiment of the present invention.

FIG. 7 is a schematic diagram to show an exemplary embodiment of a charge and leakage circuit 60, where an NMOS switch 68 is used instead of the first switch 24 and the diode 26 (see FIG. 3C). The charge and leakage circuit 60 may be included in the enhanced ID flag circuits 50-A, 50-B, as well as in the basic ID flag circuit 10 of FIG. 3A. In FIG. 7, the persistence duration is controlled by controlling the voltage on the first capacitor 16. The accuracy with which persistence duration of the state of the ID flag is controlled may depend on how accurately the voltage on the first capacitor 16 is controlled. For example, if the voltage that is stored on the first capacitor 16 varies due to temperature, then it will take longer to discharge the first capacitor 16 when the temperature is higher than when the temperature is lower. The forward voltage of an NMOS diode (e.g., the NMOS switch 68) varies with temperature, which may cause variation in the stored voltage at different temperatures.

The drain of the NMOS switch 68, which corresponds to a voltage node 62, may be controlled by a CMOS inverter 64 in order to keep the leakage current low when an ID flag circuit (e.g., the enhanced ID flag circuit 50-B) is powering up. A regulated supply voltage that can be measured at a voltage node 66, VREF, powers the CMOS inverter 64. The voltage at the voltage node 66 is lower than VDD. An inverter 70, powered by VDD, switches the gate of the NMOS switch 68. When VDD is sufficiently higher than VREF (e.g., the threshold voltage is reached and the second switch 28 is closed, see FIG. 3C), the first capacitor 16 is being charged to VREF. In this exemplary embodiment, the stored voltage on the first capacitor 16 is more constant than where the first capacitor 16 is charged to VDD, because it is not dependent on the variations in the forward voltage drop of a diode (e.g., the NMOS diode 26 in FIG. 3C). The stored voltage on the first capacitor 16 may also be more constant if VREF has less variation than VDD. Consequently, when the voltage stored on the first capacitor 16 is more constant there is less variation in the persistence time of the status of the ID flag.

In one exemplary embodiment of the present invention, there may be two supply voltages; VDD_reg that is internally regulated, and VDD_rect that comes straight off of a rectifier (e.g., a circuit that converts the RF into voltage). If the rectifier output voltage, VDD_rect is used for VDD, that voltage could vary from about one volt to two volts, whereas VDD_reg that can be used for VREF may vary from about seven tenths of a volt to one volt.

Figure 8:
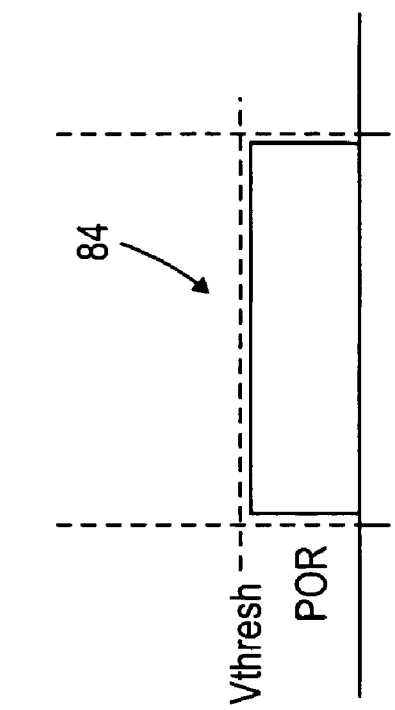
FIG. 8 includes time/voltage diagrams for the enhanced ID flag circuit, according to one exemplary embodiment of the present invention.
Figure 8:
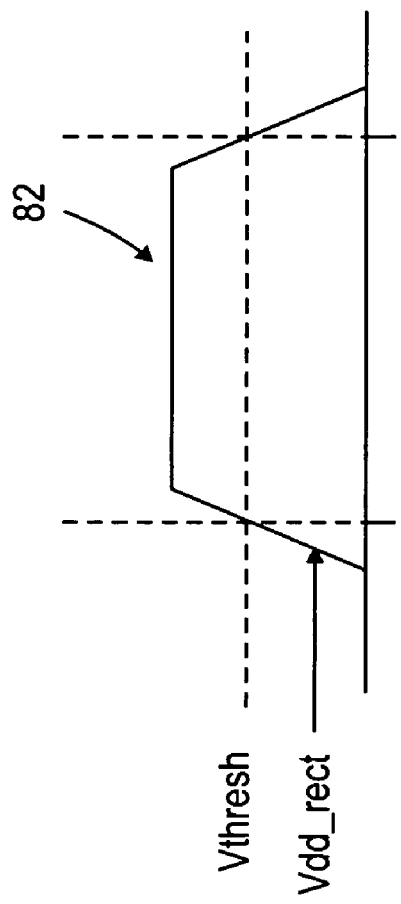

FIG. 8 includes time/voltage diagrams showing the VDD_rect signal 82 and an active low POR signal 84. The POR signal 84 starts out low when VDD_rect signal 82 is below a threshold, and holds the RFID tag 100 (see FIG. 1) in reset condition until the rectified voltage, VDD_rect signal 82, reaches the threshold. When VDD_rect signal 82 reaches the threshold, the POR signal 84 goes high. Referring to FIG. 6, the POR signal 84 is applied to the TRACK voltage node 38 such that the switch 34 closes when the power is available.

It should also be noted that embodiments of the present invention may be implemented and not only as a physical circuit or module (e.g., on a semiconductor chip) but, also within a machine-readable media. For example, the circuits and designs described above may be stored upon, or embedded within, a machine-readable media associated with a design tool used for designing semiconductor devices. Examples include a netlist formatted in the VHSIC Hardware Description Language (VHDL), the Verilog language, or the SPICE language. Some netlist examples include a behavioral level netlist, a register transfer level, (RTL) netlist, a gate level netlist, and a transistor level netlist. Machine-readable media include media having layout information, such as a GDS-II file. Furthermore, netlist files and other machine-readable media for semiconductor chip design may be used in a simulation environment to perform any one or more methods described above. Thus it is also to be understood that embodiments of the present invention may be used, or to support, a software program executing on some processing core (e.g., a CPU of a computer system), or otherwise implemented or realized within a machine-readable medium. A machine-readable medium may include any mechanism for storing and transmitting information in a form readable by a machine (e.g., a computer). For example, a machine readable-readable medium may comprise a read-only memory (ROM), a random access memory (RAM), magnetic disc storage media, optical storage media, flash memory devices, electrical, optical, acoustic, or other form of propagated signal (e.g., a carrier wave, infrared signal, radio-frequency signal, a digital signal, etc.).

Thus, method and apparatus for controlled persistent ID flag for RFID applications have been described. Although the present has been described with reference to specific exemplary embodiments, it will be evident that various modifications and changes may be made to these embodiments without departing from the broader scope and spirit of the invention. Accordingly, the specification and drawings are to be regarded in an illustrative rather than a restrictive sense.

What is claimed is:

1. A Radio-Freguency Identification (RFID) transponder including:
    an identification flag circuit to maintain an RFID transponder state, the identification flag circuit including a first capacitor and a digital element coupled to the first capacitor receive a voltage of the first capacitor;
    a discharge circuit to drain the first capacitor via a discharge current that is distinct from a semiconductor leakage current; and,
    a charge circuit, wherein the semiconductor leakage current is through an open switch of the charge circuit.

2. A Radio-Freguency Identification (RFID) transponder including:
    an identification flag circuit to maintain an RFID transponder state, the identification flag circuit including a first capacitor and a digital element coupled to the first capacitor to receive a voltage of the first capacitor, wherein the digital element is a comparator, the comparator being to output a signal indicative of the identification flap; and
    a discharge circuit to drain the first capacitor via a discharge current that is distinct from a semiconductor leakage current.

3. A Radio-Frequency Identification (RFID) transponder including:
    an identification flag circuit to maintain an RFID transponder state, the identification flag circuit including a first capacitor and a digital element coupled to the first capacitor to receive a voltage of the first capacitor; and
    a discharge circuit to drain the first capacitor via a discharge current that is distinct from a semiconductor leakage current, wherein the discharge circuit is to maintain the discharge current substantially constant with temperature.

4. The RFID transponder of claim 3, wherein the ID flag circuit further includes a leakage circuit to allow a leakage current to discharge the capacitor in addition to the discharge current.

5. A Radio-Frequency Identification (RFID) transponder including:
    an identification flag circuit to maintain an REID transponder state, the identification flag circuit including a first capacitor and a digital element coupled to the first capacitor to receive a voltage of the first capacitor; and
    a discharge circuit to drain the first capacitor via a discharge current that is distinct from a semiconductor leakage current, wherein the discharge current decreases with temperature.

6. The RFID transponder of claim 5, wherein the discharge current is higher than the semiconductor leakage current.

7. A Radio-Frequency Identification (RFID) transponder including:
    an identification flag circuit to maintain an RFID transponder state, the identification flag circuit including a first capacitor and a digital element coupled to the first capacitor to receive a voltage of the first capacitor; and,
    a discharge circuit to drain the first capacitor via a discharge current that is distinct from a semiconductor leakage current, wherein the discharge current is lower than the semiconductor leakage current.

8. A Radio-Frequency Identification (RFID) transponder including:
    an identification flag circuit to maintain an RFID transponder state, the identification flag circuit including a first capacitor and a digital element coupled to the first capacitor to receive a voltage of the first capacitor; and
    a discharge circuit to drain the first capacitor via a discharge current that is distinct from a semiconductor leakage current, wherein the discharge circuit includes:
        a discharge circuit capacitor to store voltage; and
        a transconductor circuit coupled to the discharge circuit capacitor to convert voltage stored on a discharge circuit capacitor into the discharge current.

9. The RFID transponder of claim 8, wherein the transconductor circuit includes:
    a first transistor having a gate, a source and a drain, the gate coupled to the discharge circuit capacitor; and
    a second transistor having a gate, a source and a drain the gate coupled to the discharge circuit capacitor.

10. The RFID transponder of claim 9, wherein the discharge circuit capacitor is to store the gate voltage of the first transistor and the gate voltage of the second transistor responsive to detection of power loss on the RFID transponder.

11. The RFID transponder of claim 9, wherein the first transistor and the second transistor are NMOS transistors.

12. The RFID transponder of claim 9, wherein a W/L ratio of the second transistor is smaller than a W/L ratio of the first transistor.

13. The RFID transponder of claim 8, wherein the discharge circuit includes a discharge circuit switch coupled to the discharge circuit capacitor and adapted to open responsive to detection of power loss on the RFID transponder.

14. A Radio-Frequency Identification (RFID) transponder including:
    an identification flag circuit to maintain an RFID transponder state, the identification flag circuit including a first capacitor and a digital element coupled to the first capacitor to receive a voltage of the first capacitor;
    a discharge circuit to drain the first capacitor via a discharge current that is distinct from a semiconductor leakage current; and,
    a digital non-volatile memory to control accuracy of the discharge current.

15. A method to control persistence of an RFID transponder state, comprising:
    charging to a supply voltage a capacitor operative to indicate the RFID transponder state; and
    draining the capacitor with a discharge current distinct from a semiconductor leakage current from an open switch wherein the discharge current is lower than the semiconductor leakage current.

16. The method of claim 15, wherein the capacitor is charged responsive to responding to an interrogation signal.

17. The method of claim 15, further comprising: additionally draining the capacitor with the semiconductor leakage current.

18. The method of claim 15, wherein the discharge current is higher than the semiconductor leakage current.

19. The method of claim 15, wherein the RFID transponder state persists during a power loss at the RFID transponder for a predetermined period of time.

20. The method of claim 19, wherein the predetermined period of time is more than or equal to 500 milliseconds.

21. The method of claim 19, wherein the predetermined period of time is less than or equal to 20 seconds.

22. The method of claim 19, wherein the RFID transponder state persists during a power loss at the RFID transponder for the predetermined period of time at temperatures between negative 25 degrees Celsius and 50 degrees Celsius.

23. The method of claim 15, wherein the RFID transponder state is represented by a single bit.

24. A device to control persistence of an RFID transponder state, comprising:
   means for charging to a supply voltage a capacitor operative to indicate the RFID transponder state; and
   means for draining the capacitor with a discharge current distinct from a semiconductor leakage current from an open switch, wherein the discharge current is lower than the semiconductor leakage current.

25. The device of claim 24, wherein the capacitor is charged responsive to responding to an interrogation signal.

26. The device of claim 24, further comprising:
   means for additionally draining the capacitor with the semiconductor leakage current.

27. The device of claim 24, wherein the discharge current is higher than the semiconductor leakage current.

28. The device of claim 24, wherein the RFID transponder state persists during a power loss at the RFID transponder for a predetermined period of time.

29. The device of claim 28, wherein the predetermined period of time is more than or equal to 500 milliseconds.

30. The device of claim 28, wherein the predetermined period of time is less than or equal to 20 seconds.

31. The device of claim 28, wherein the RFID transponder state persists during a power loss at the RFID transponder for the predetermined period of time at temperatures between negative 25 degrees Celsius and 50 degrees Celsius.

32. The device of claim 24, wherein the RFID transponder state is represented by a single bit.

* * * * *

UNITED STATES PATENT AND TRADEMARK OFFICE
CERTIFICATE OF CORRECTION

PATENT NO. : 7,215,251 B2 Page 1 of 1
APPLICATION NO. : 10/887617
DATED : May 8, 2007
INVENTOR(S) : Hyde It is certified that error appears in the above-identified patent and that said Letters Patent is hereby corrected as shown below:

In column 9, line 5, in Claim 1, delete "Radio-Freguency" and insert
-- Radio-Frequency --, therefor.

In column 9, line 10, in Claim 1, after "capacitor" insert -- to --.

In column 9, line 16, in Claim 2, delete "Radio-Freguency" and insert
-- Radio-Frequency --, therefor.

In column 9, line 24, in Claim 2, delete "flap;" and insert -- flag; --, therefor.

In column 9, line 45, in Claim 5, delete "REID" and insert -- RFID --, therefor.

Signed and Sealed this

First Day of April, 2008

JON W. DUDAS
*Director of the United States Patent and Trademark Office*